US011141642B2

(12) United States Patent
Horne

(10) Patent No.: US 11,141,642 B2
(45) Date of Patent: Oct. 12, 2021

(54) MOTION SENSING BASKETBALL TRAINING DEVICE

(71) Applicant: Wesley Horne, Charleston, SC (US)

(72) Inventor: Wesley Horne, Charleston, SC (US)

(*) Notice: Subject to any disclaimer, the term of this patent is extended or adjusted under 35 U.S.C. 154(b) by 0 days.

(21) Appl. No.: 16/918,879

(22) Filed: Jul. 1, 2020

(65) Prior Publication Data

US 2020/0398135 A1 Dec. 24, 2020

Related U.S. Application Data

(63) Continuation-in-part of application No. 15/146,937, filed on May 5, 2016, now abandoned.

(51) Int. Cl.
*A63B 69/00* (2006.01)
*A63B 71/06* (2006.01)

(52) U.S. Cl.
CPC ...... *A63B 69/0071* (2013.01); *A63B 71/0622* (2013.01); *A63B 2071/0655* (2013.01); *A63B 2071/0663* (2013.01); *A63B 2220/40* (2013.01)

(58) Field of Classification Search
CPC ............ A63B 69/0071; A63B 71/0622; A63B 2071/0655; A63B 2071/0663; A63B 2220/40

USPC ......................................... 473/422, 450, 458
See application file for complete search history.

(56) References Cited

U.S. PATENT DOCUMENTS

| | | | | |
|---|---|---|---|---|
| 7,771,293 B1* | 8/2010 | Vann | ................... | A63B 69/0071 473/422 |
| 7,854,668 B2* | 12/2010 | Shelton | .............. | A63B 69/0071 473/450 |
| 8,845,461 B2* | 9/2014 | Duke | .................. | A63B 69/0071 473/450 |
| 9,381,415 B1* | 7/2016 | DiGregorio | ........ | A63B 24/0075 473/570 |
| 2007/0219025 A1* | 9/2007 | Aberton | ............. | A63B 24/0003 473/450 |

* cited by examiner

*Primary Examiner* — Mitra Aryanpour
(74) *Attorney, Agent, or Firm* — Gregory Finch; Finch Paolino, LLC

(57) ABSTRACT

A motion sensing basketball training device for measuring the movement of a user's wrist and/or thumb during a basketball shot. Embodiments of the present disclosure provide for an apparatus and system that measures the acceleration of a user's guide hand during a basketball shot. If the user's guide arm accelerates above a threshold value, an alert is delivered to the user. The alert indicates to the user that proper technique was not maintained during the basketball shot. Embodiments of the present disclosure include a wrist worn wearable device and/or an application executing on a smart watch.

11 Claims, 6 Drawing Sheets

MOTION SENSING BASKETBALL TRAINING DEVICE

CROSS-REFERENCE TO RELATED APPLICATIONS

The present application is a continuation-in-part of U.S. patent application Ser. No. 15/146,937 filed May 5, 2016, and titled "Motion Sensing Basketball Training Device," the contents of which are hereby incorporated by reference herein in their entirety.

FIELD

The present disclosure relates to improvements in the technical field of sports training aids; in particular, a wearable electronic device capable of detecting and alerting a user to the proper position of a user's wrist and/or thumb through a basketball shot.

BACKGROUND

Basketball is a popular sport played by professionals and amateurs alike and is also a wide-viewed sport that is typically broadcasted on national and local television. The game is often played in schoolyard playgrounds, at parks, in residential driveways, and at local recreational centers. An organized basketball game is played on a basketball court having a playing surface that consists of a generally rectangular floor and two basketball goals that are disposed at opposite ends of the basketball court and typically positioned ten feet from the court. A basketball goal includes a round metal rim or hoop that is secured to backboard, which is attached to a frame, and netting that is suspended from the rim. The diameter of the basketball hoop is larger than that of a basketball to allow the ball to fall through the hoop during play. The playing surface includes a number of geometric markings, such as circles, arcs, and a variety of straight and curved lines, that define the playing boundaries prescribed by game rules. Teams compete against each other over the course of two to three hours where players assume offensive and defensive roles while attempting to score points on each other's basketball goals by throwing a basketball through the opponent's basketball hoop. The team with the most points wins.

During the basketball game, players normally employ guard, center and forward positions on the basketball court. More particularly, the playing positions are typically defined as point guard, shooting guard, small forward, power forward, and center. Each player assumes a particular position based on the player's performance skills. For example, the player assigned to a point guard position is usually the person who is the team's best basketball handler and passer, and a shooting guard is usually the team's best basketball shooter.

Many individuals simply enjoy the opportunity to shoot basketballs without having to follow particular rules or participate in officiated games. As such, the game is often played with fewer players and basketball shots are made on a basketball goal that is often attached to a garage or fixed to a frame that is secured to a base having a ballast. Whether on a team or playing solo, basketball players consistently strive to gain the satisfaction of improving the frequency of successful basketball shots.

Players constantly train to perfect their shooting skills of the basketball on the court. A player must master the ability to make successful shots on goal from various positions on the basketball court. Players spend countless hours practicing a variety of different shots that generally include two-handed shots, one-handed shots, jump shots, hook shots, lay-up shots, one-handed underhand, three-point shots, and bank shots. To improve the frequency rate of successful shots made on basketball goal, it is important for individual players to practice their shooting skills by shooting basketballs from different locations on the basketball court. Proper technique when shooting the basketball is perhaps the most important aspect in improving a player's shooting accuracy and consistency. To better assist individual players in improving their shooting skills, and gaining confidence in their shooting abilities, many players have employed the help of shooting aids.

There are a number of shooting aids on the market today that are designed to help a basketball player improve his/her shooting skills. Examples of shooting aids include; video camera based tracking systems that capture images of shot trajectories; mechanical braces used on an individual's arm, wrist or hand to help position the extremities in proper angle for successfully shooting a basketball within a hoop; spot location devices, such as floor mats or position markers that are placed on a playing surface to indicate shot locations to a player from where to make basketball shots; gesture recognition systems that include a plurality of markers fixed to a person's body to permit a camera to capture and analyze body movements during play; sophisticated computer analysis systems including complex software used for analyzing a basketball player's performance; and finally, a variety of self-contained electronic devices that are attached to a player to provide an audio or illuminated signal to indicate improper positioning of a player, or an indication of a successful shot being made.

Many conventional shooting aid devices or systems are too complex or sophisticated to integrate for use, are expensive, and require time consuming assembly. Other devices are bulky to use, non-user friendly, and are simply ineffective in assisting basketball players for improving their shooting skills. What is needed, therefore, is a shooting aid that is user-friendly, is effective in improving shooting technique, and is inexpensive.

Through applied effort, ingenuity, and innovation, Applicant has identified a number of deficiencies and problems associated with basketball training aids. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present disclosure is a basketball training device comprising a housing having a rear side, a face side, and side walls, the housing having a wrist strap coupled to the side walls; an accelerometer coupled to an interior portion of the housing, the accelerometer being operable to capture acceleration data during a basketball shot; a microprocessor operably engaged with the accelerometer and coupled to the interior portion of the housing, the microprocessor being operable to receive and process the acceleration data from the accelerometer, the microprocessor being further operable to execute at least one feedback protocol in response to the acceleration data; an output means operably engaged with the microprocessor and coupled to the interior portion of the housing, the output means being operable to deliver feedback to a user in response to feedback instruction from the microprocessor; and, a power supply operably engaged with the microprocessor, the output mean, and the accelerometer, and coupled to the interior portion of the housing.

Another object of the present disclosure is a wrist-worn basketball training device comprising a housing having a rear side, a face side, and side walls, the housing having a wrist strap coupled to the side walls; a three-axis accelerometer operably engaged with a microprocessor, the three-axis accelerometer and the microprocessor being coupled to an interior portion of the housing, the microprocessor being operable to receive and process acceleration data from the three-axis accelerometer and execute at least one feedback protocol in response to the acceleration data; and, a vibrating alert motor operably engaged with the microprocessor, the vibrating alert motor operable to deliver a vibration in response to a g-force measurement by the three-axis accelerometer in excess of 2 g along the x-axis.

Yet another object of the present disclosure is a basketball training system comprising a means for measuring movement of a user's wrist during a basketball shot; a means for processing movement data of the user's wrist during a basketball shot; and, a means for providing feedback to the user in response to the movement data from the user's wrist during the basketball shot exceeding a predefined threshold value.

Certain aspects of the present disclosure provide for a basketball training system comprising a housing having a rear side, a face side, and side walls, the housing having a wrist strap coupled to the side walls; a three-axis accelerometer coupled to an interior portion of the housing, the three-axis accelerometer being configured to capture acceleration data consisting of a g-force value along an x-, y-, and z-axis of a non-shooting hand of a user during a basketball shot; a microprocessor operably engaged with the three-axis accelerometer and coupled to the interior portion of the housing, the microprocessor being configured to receive and process the acceleration data from the three-axis accelerometer, the microprocessor being further configured to execute at least one feedback protocol in response to the acceleration data; an output means operably engaged with the microprocessor and coupled to the interior portion of the housing, the output means being configured to deliver feedback to the user in response to a feedback instruction from the microprocessor, wherein the feedback protocol comprises communicating the feedback instruction to the output means in response to a rotational or an acceleration g-force measurement by the three-axis accelerometer in excess of 2 g along the x-, y-, or z-axis of the user's non-shooting hand; a power supply operably engaged with the microprocessor, the output means, and the three-axis accelerometer, and coupled to the interior portion of the housing; and, a smart phone communicably engaged with the microprocessor, the smart phone being configured to receive the acceleration data consisting of the g-force value along the x-, y-, and z-axis of the non-shooting hand of the user during the basketball shot, the smart phone being configured to analyze the user's shooting form using the acceleration data, and provide a user interface comprising a shooting form analysis to the user, the shooting form analysis consisting of g-force data corresponding to movement of the user's thumbs on the non-shooting hand and the shooting hand and g-force data corresponding to rotation of the user's wrist on the user's non-shooting hand.

Certain embodiments of the basketball training system of the present disclosure may further comprise a memory device operably engaged with the microprocessor and configured to store acceleration data from the accelerometer. In certain embodiments, the output means is a vibrating alert motor. The basketball training system may further comprise a display means operably connected with the microprocessor and coupled to the face side of the housing. In certain embodiments, the output means is in a format selected from the group consisting of visual, auditory, and haptic. In certain embodiments, the display means further comprises an input/output means.

Further aspects of the present disclosure provide for a wrist-worn basketball training system comprising a housing having a rear side, a face side, and side walls, the housing having a wrist strap coupled to the side walls; a three-axis accelerometer operably engaged with a microprocessor, the accelerometer and the microprocessor being coupled to an interior portion of the housing, the microprocessor being configured to receive and process acceleration data consisting of a g-force value along an x-, y-, and z-axis of a non-shooting hand of a user during a basketball shot from the accelerometer and execute at least one feedback protocol in response to a rotational or an acceleration g-force measurement by the three-axis accelerometer in excess of 2 g along the x-, y-, or z-axis of the user's non-shooting hand; a vibrating alert motor operably engaged with the microprocessor, the vibrating alert motor being configured to deliver a vibration in response to the rotational or the acceleration g-force measurement by the accelerometer in excess of 2 g along the x-axis of the user's non-shooting hand; and a smart phone communicably engaged with the microprocessor, the smart phone being configured to receive the acceleration data consisting of the g-force value along the x-, y-, and z-axis of the non-shooting hand of the user during the basketball shot, the smart phone being configured to analyze the user's shooting form using the acceleration data, and provide a user interface comprising a shooting form analysis to the user, the shooting form analysis consisting of g-force data corresponding to movement of the user's thumbs on the non-shooting hand and the shooting hand and g-force data corresponding to rotation of the user's wrist on the user's non-shooting hand.

In accordance with certain aspects of the present disclosure, the wrist-worn basketball training system may further comprise a memory device operably engaged with the microprocessor and configured to store acceleration data from the accelerometer. In accordance with certain embodiments, the wrist-worn basketball training system may further comprise a display means operably connected with the microprocessor and coupled to the face side of the housing. In certain embodiments, the microprocessor is that of a smart watch. The wrist-worn basketball training system may further comprise an output means for communicating the acceleration data from the accelerometer to the user.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 2:
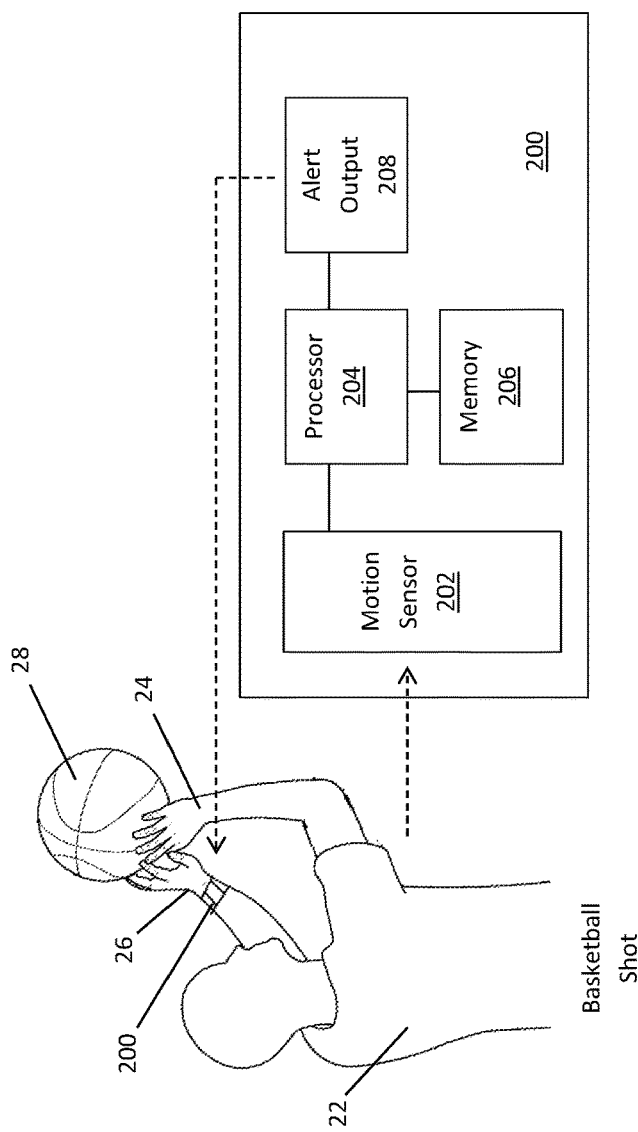
FIG. 2 is a functional block diagram of a basketball training system, according to an embodiment.

Embodiments of the present disclosure provide for an apparatus and system that measures the acceleration of a user's guide hand during a basketball shot. In the game of basketball, proper shooting technique dictates the placement and movement of the shooter's hands from the loading point through the follow through. The shooting hand is the hand that guides and accelerates the ball through the shot. The guide hand (also referred to as the non-shooting hand or balance hand) provides balance to the basketball leading up to the shot. The following is a brief overview of proper form and technique for stationary basketball shooting:

GRIP: The shooter should place the air hole of the basketball between the middle and index fingers. The shooter's fingertip pads should line up parallel to the long seams of the ball, so the shooter can monitor the back spin of the basketball. A space should remain between the ball and the middle of palm, such that the shooter is able to insert a pencil between the ball and the palm area. Fingers should be spread far enough apart to comfortably balance the ball in one hand (the shooting hand), and the ball should sit on the finger pads of the shooting hand.

BALANCE HAND: The guide hand, or balance hand, should be on the side of the ball. The balance hand should not add force or spin to the shot, should not move on delivery and should always come off the ball before the shooting hand.

DELIVERY: The ball should start motion directly upwards from the shot pocket, without dipping the ball. The shooter's elbow should be positioned comfortably under the ball, with the ball remaining in front of the shooter through the shot. The shooter should uncoil his or her body with knees, hips and elbows all coordinated on delivery. The elbow and wrist should extend in a straight line to the basket. The shooting hand should extend in a straight line to the rim. The ball should come off the hand with perfect symmetrical backspin. The guide hand should stay to the side and not influence the flight of the ball.

UPFORCE AND LANDING: The shooter should release the ball on the way up, just before the top of the jump, using legs to generate up force. The shooter's knees, hips and elbows should lock out together, and the ball should be released as the elbows extend. The shooter should land in the same spot from which he or she jumped, indicating good balance on the shot.

FOLLOW-THROUGH: The shooter's wrists should be relaxed and floppy. Fingers should be pointed at the target (rim) with a high finish. The shooter should see be able to see his or her fingers at the top square of the back board. The shooter should hold the follow-through position until the ball hits the rim.

A common departure from proper shooting form and technique is improper use of the balance hand. This may include adding force or spin to the shot from the balance hand, movement on delivery, or holding the balance hand on the ball through the shot. Examples of improper form and technique of the guide hand included breaking the wrist, double wristed shot, snapping the wrist, firing the thumb, turning the wrist, and any combination thereof.

Embodiments of the present disclosure provide for a device coupled to the guide hand of the user that measures to movement of the user's guide hand through the shot. If the user's guide hand accelerates above a threshold value, an alert is delivered to the user. The alert indicates to the user that proper technique was not maintained during the basketball shot, examples of which are illustrated above. Embodiments of the present disclosure include a wrist worn wearable device and/or an application executing on a smart watch. An accelerometer, or other motion sensor, captures movement of the guide hand through the shot. A processor in the device receives the acceleration data from the accelerometer or other motion sensor and executes a protocol to evaluate whether the acceleration data exceeds a threshold value. If the acceleration data exceeds a threshold value, the device delivers an alert message to the user indicating that the guide hand did not maintain proper form and technique through the shot. If the acceleration data does not exceed the threshold value, an alert is not sent—indicating proper form and technique in the guide hand was maintained through the shot.

Figure 1:
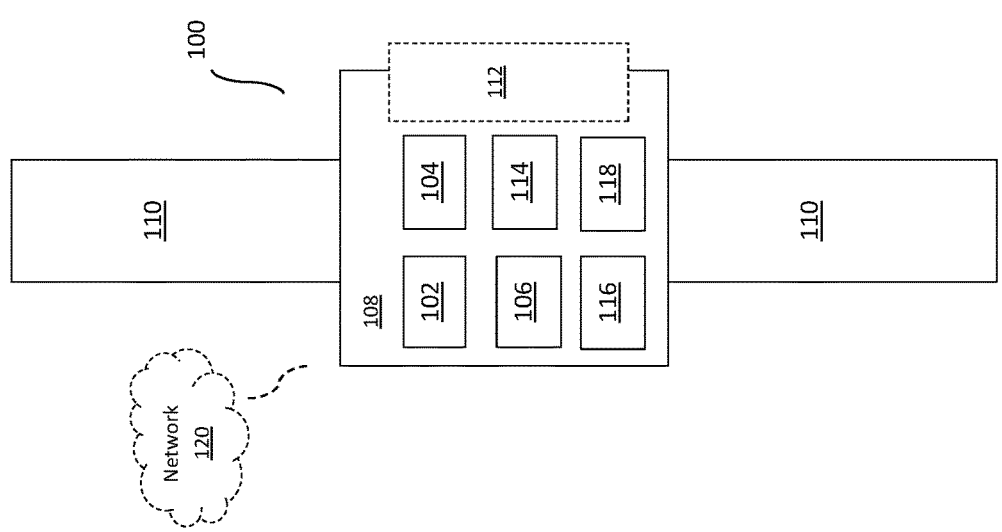
FIG. 1 is an architecture diagram of a basketball training system, according to an embodiment.
Figure 3:
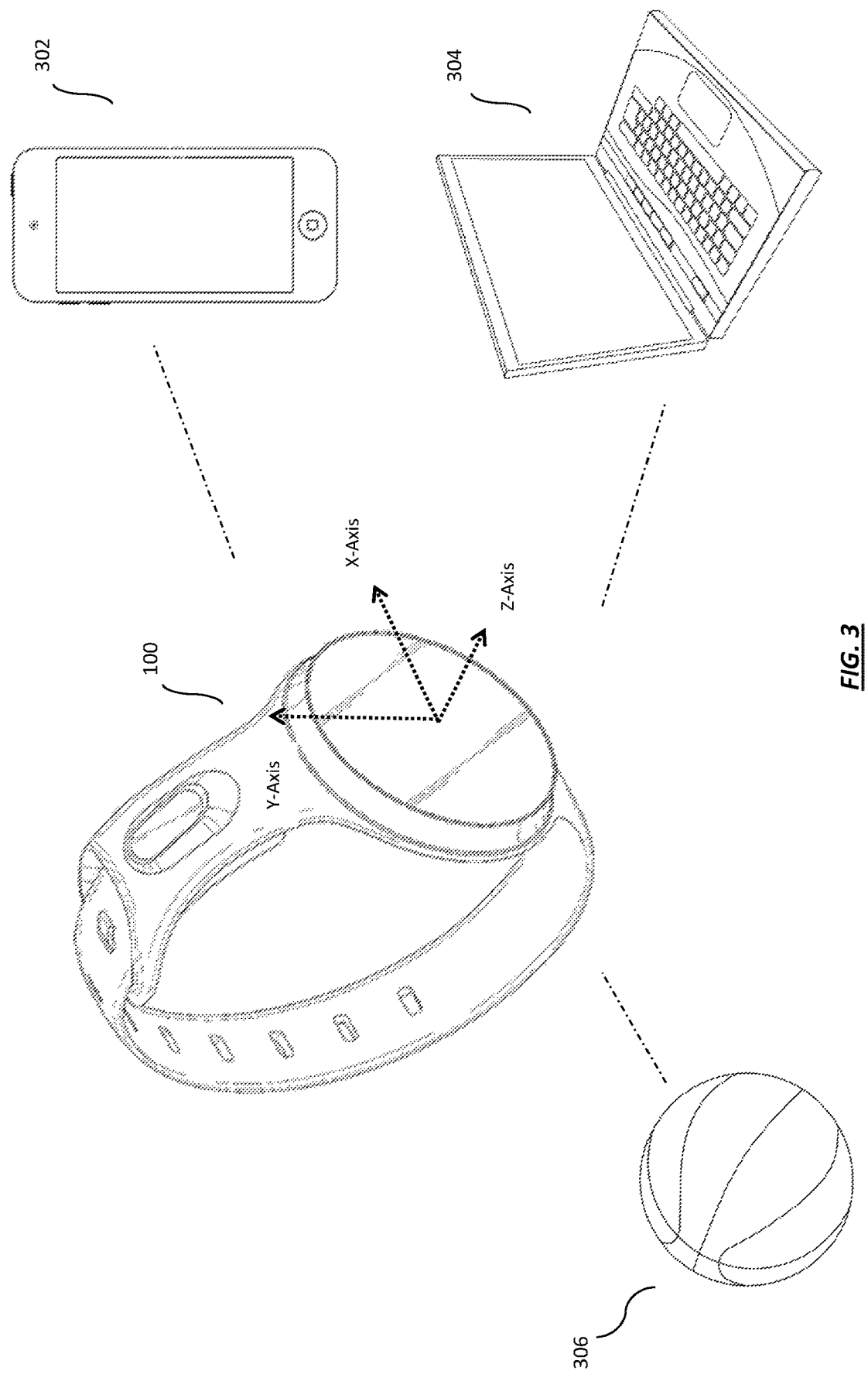
FIG. 3 is a system diagram of a basketball training system, according to an embodiment.

Referring now to FIG. 1, an architecture diagram of a basketball training system is shown. According to an embodiment, a basketball training system is generally comprised of a device 100 worn on a user's wrist, and an optional network connection 120. Device 100 is generally comprised of a motion sensor 102, a microprocessor 104, a vibrating alert motor 106, a housing 108, a wrist strap 110, a display 112, an (optional) audio output 114, a power supply 116, and a (optional) memory device 118. In accordance with certain embodiments, the basketball training system may further comprise a smart phone 302 and personal computer 304 (as shown in FIG. 3). Various routines and operations of the basketball training system may be executed in whole or in part on device 100, smart phone 302 and personal computer 304, and/or combinations thereof.

Motion sensor 102 may be an accelerometer, e-compass, inertial measurement unit, gyro, magnetometer or the like. In a preferred embodiment, motion sensor 102 is a three-axis accelerometer; however, a single axis may be readily substitutable. Motion sensor 102 may be comprised of a plurality of sensors. In embodiments where multiple sensors are utilized, an optional filter may be included to combine sensor output and deliver it to the microprocessor 104.

Microprocessor 104 may be any commercial-off-the-shelf microprocessor. A microprocessor is a computer processor that incorporates the functions of a computer's central processing unit (CPU) on a single integrated circuit (IC), or at most a few integrated circuits. A microprocessor is a multipurpose, clock driven, register based, programmable electronic device that accepts digital data or binary data as input, processes it according to instructions stored in memory, and provides results as output. In accordance with various aspects of the present disclosure, microprocessor 104 configured to execute the instructions stored in memory to perform one or more operations for processing the acceleration data from motion sensor 102. In certain embodiments, microprocessor 104 is configured to receive and process acceleration data consisting of a g-force value along an x-, y-, and z-axis of a non-shooting hand of a user during a basketball shot from the accelerometer and execute at least one feedback protocol in response to a rotational or an acceleration g-force measurement by the three-axis accelerometer in excess of 2 g along the x-, y-, or z-axis of the user's non-shooting hand. Vibrating alert motor 106 operably engaged with microprocessor 104 to deliver a vibration in response to the rotational or the acceleration g-force measurement by the accelerometer in excess of 2 g along the x-axis of the user's non-shooting hand. Smart phone 304 (as shown in FIG. 3) may be communicably engaged with microprocessor 104 to receive the acceleration data consisting of the g-force value along the x-, y-, and z-axis of the non-shooting hand of the user during the basketball shot. Smart phone 304 may process the acceleration data to analyze the user's shooting form using the acceleration data and provide a user interface comprising a shooting form analysis to the user. In certain embodiments, the shooting form analysis includes g-force data corresponding to movement of the user's thumbs on the non-shooting hand and the shooting hand and g-force data corresponding to rotation of the user's wrist on the user's non-shooting hand.

Microprocessor 104 may be operably engaged with memory device 118. Memory device 118 may be any volatile or non-volatile memory and may be operable to store acceleration data and other shot statistics, such as the number of instances in which an alert was activated. Alternatively, memory may exist only on microprocessor 104.

Microprocessor 104 is operably engaged with vibrating alert motor 106, and (optionally) audio output 114. Vibrating alert motor 106 may be a small electric motor connected to an off-center weight and is operable to deliver a vibration to the user according to the alert protocol by microprocessor 104. Audio output 114 may be a PCB mount speaker, or any commercially reasonable component operable to generate an audible alert in response to the alert protocol by microprocessor 104. Display 112 may be operably engaged with processor 104 and power supply 116. Power supply 116 is a rechargeable or non-rechargeable battery. Display 112 is an interface to display shot data to the user. Display 112 may be a touch screen input/output device. In some embodiments, device 100 may not have a display.

Motion sensor 102, microprocessor 104, vibrating alert motor 106, audio output 114, power supply 116, and memory device 118 may be housed within housing 108. Housing 108 is approximately the size of a wristwatch and may resemble a wristwatch in form and design. Wrist strap 110 is coupled to housing 108 and is operable to selectively couple device 100 to the wrist of the user's guide hand.

In an embodiment, device 100 is a smart watch in which the alert protocol is an application executing on the operating system of the smart watch. Network 120 may be engaged with device 100 to communicate acceleration data and other system instructions or data transfers. Network 120 may be a local area or wide area network, and device 100 may connect to a network via WIFI, cellular data, Bluetooth, 3G, 4G and the like. Alternatively, device 100 may be self-contained and may not access a network 120.

Referring now to FIG. 2, a functional block diagram of a basketball training system is shown. According to an embodiment, a user 22 prepares for a stationary basketball shot. User 22 applies force to the basketball 28 with shooting hand 24, while balancing basketball 28 with guide hand 26, as described above. System 200 is operable to measure the rotational and/or acceleration force of guide hand 24. When user 22 takes a shot, the rotational and/or acceleration force of guide hand 24 is measured by motion sensor 202. Motion sensor 202 may be a three-axis accelerometer, single axis accelerometer, gyro, magnetometer, e-compass, inertial measurement unit, or the like, as described above. Motion sensor 202 captures the g-force of guide hand 24 and communicates the force measurement to processor 204. Processor 204 receives the force measurement and executes an alert protocol; the alert protocol being stored in memory 206. The alert protocol evaluates whether the g-force of guide hand 24 exceeds a predetermined threshold value. According to an embodiment, the threshold value is greater than 2 g. The threshold value may change depending on the sensor type; for example, if the sensor is a gyro, the threshold value may be based in another unit of measure other than g-force, such as degrees of rotation.

Depending on the sensor type and desired threshold value, the threshold to trigger an alert to the user may be increased or decreased. If the force or movement of guide hand 24 exceeds the threshold value, processor 204 delivers an alert message in the form of an alert output 208 to user 22. Alert output 208 may be a haptic (e.g. vibration), audible (e.g. tone or beep), or visual (e.g. flashing light). Alert output 208 indicates to user 22 that guide hand 24 failed to maintain proper form or technique during the basketball shot. The user or basketball coach may elect to take corrective measures on the basis of alert output 208.

Referring now to FIG. 3, a system diagram of a basketball training system is shown. According to an embodiment, device 100 (as described in FIG. 1) is shown in a smart watch embodiment. Device 100 is operable to measure the g-force of guide hand of a user during a basketball shot along the x-, y-, and z-axis, and execute an alert protocol in response to the g-force of the guide hand exceeding a predetermined threshold value (as described in FIG. 2). In an embodiment, device 100 may be communicably engaged with a smart phone 302, a personal computer 304 and/or a smart basketball 306. Smart phone 302 and personal computer 304 may be used as an interface to device 100 and may receive and process sensor data captured by device 100 to perform analytics on the user's basketball shot. A smart basketball 306 may include one or more sensors that are communicably engaged with device 100 and smart phone 302 and personal computer 304. Smart basketball 306 and device 100 may be able to analyze multiple aspects of shooting form and technique, including ball trajectory, ball spin, and force. In certain embodiments, smart phone 304 may be communicably engaged with device 100 to receive acceleration data consisting of the g-force value along the x-, y-, and z-axis of the non-shooting hand of the user during the basketball shot. Smart phone 304 may process the acceleration data to analyze the user's shooting form using the acceleration data and provide a user interface comprising a shooting form analysis to the user. In certain embodiments, the shooting form analysis includes g-force data corresponding to movement of the user's thumbs on the non-shooting hand and the shooting hand and g-force data corresponding to rotation of the user's wrist on the user's non-shooting hand.

Figure 4:
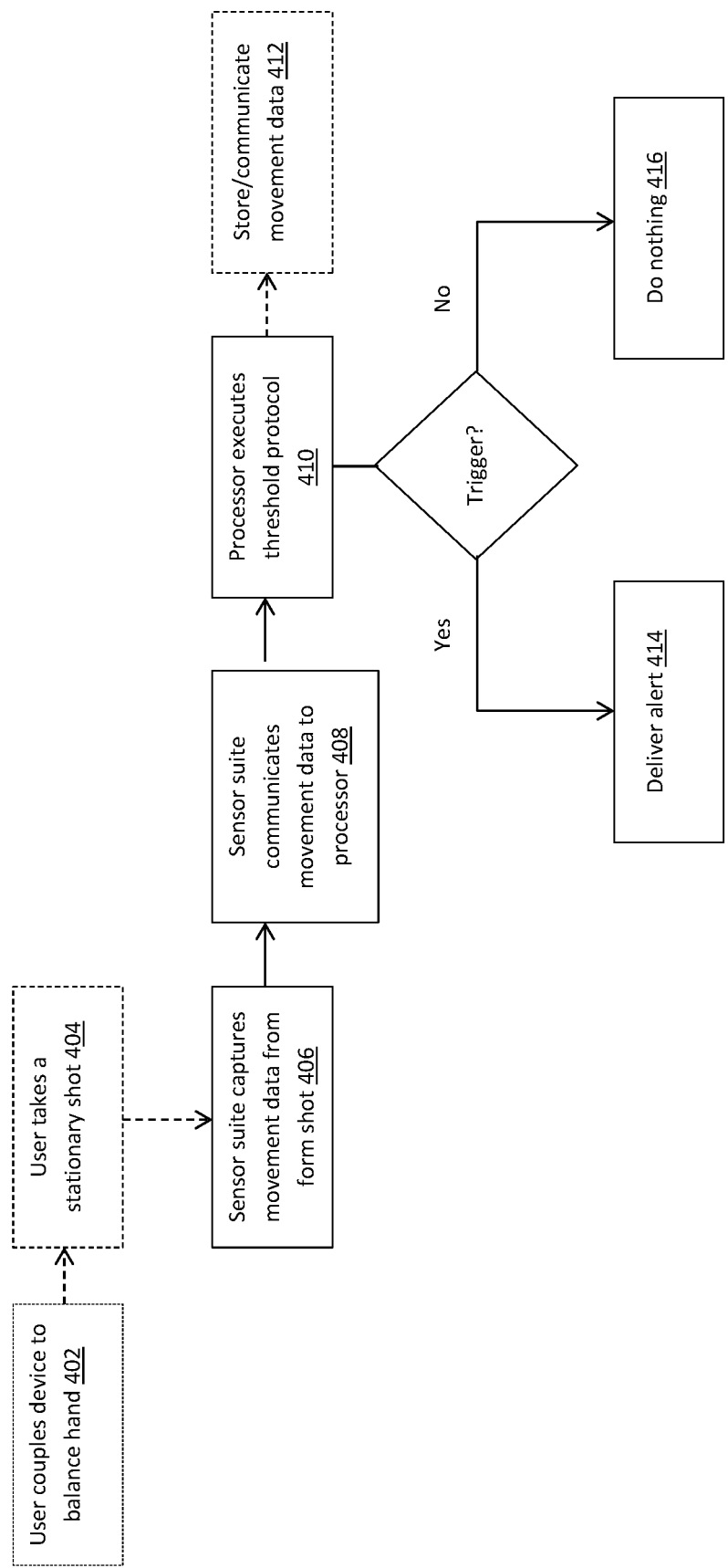
FIG. 4 is a process flow diagram of a basketball training system, according to an embodiment.

Referring now to FIG. 4, a process flow diagram of a basketball training system is shown. According to an embodiment, a user couples a device (as shown and described in FIG. 1) to the user's balance hand or guide hand 402 (i.e. non-shooting hand). The user takes a stationary basketball shot 404. One or more sensors capture movement data from the guide hand through the form shot 406. Sensors may include three-axis accelerometer, single axis accelerometer, gyro, magnetometer, e-compass, inertial measurement unit, or the like, as described above. The one or more sensors communicate the movement data from the form shot to a processor 408. The processor executes a threshold protocol in response to the movement data 410. If the movement data exceeds a predetermined trigger value, the device delivers a feedback response to the user 414. The feedback response may be audio, haptic, visual or any combination thereof. If the movement data does not exceed the predetermined trigger value, the device does nothing. The user may elect to increase or decrease the trigger value depending on the level of movement the user desires to measure in the guide hand through the basketball shot. The feedback response is intended to prevent the guide hand from assisting with acceleration during the basketball shot, thereby promoting muscle memory in the user of the intending shooting technique. The device may record a history of the movement data and may communicate that data to the user through a visual display or in communication with an external device such as a smart phone 412.

Figure 5:
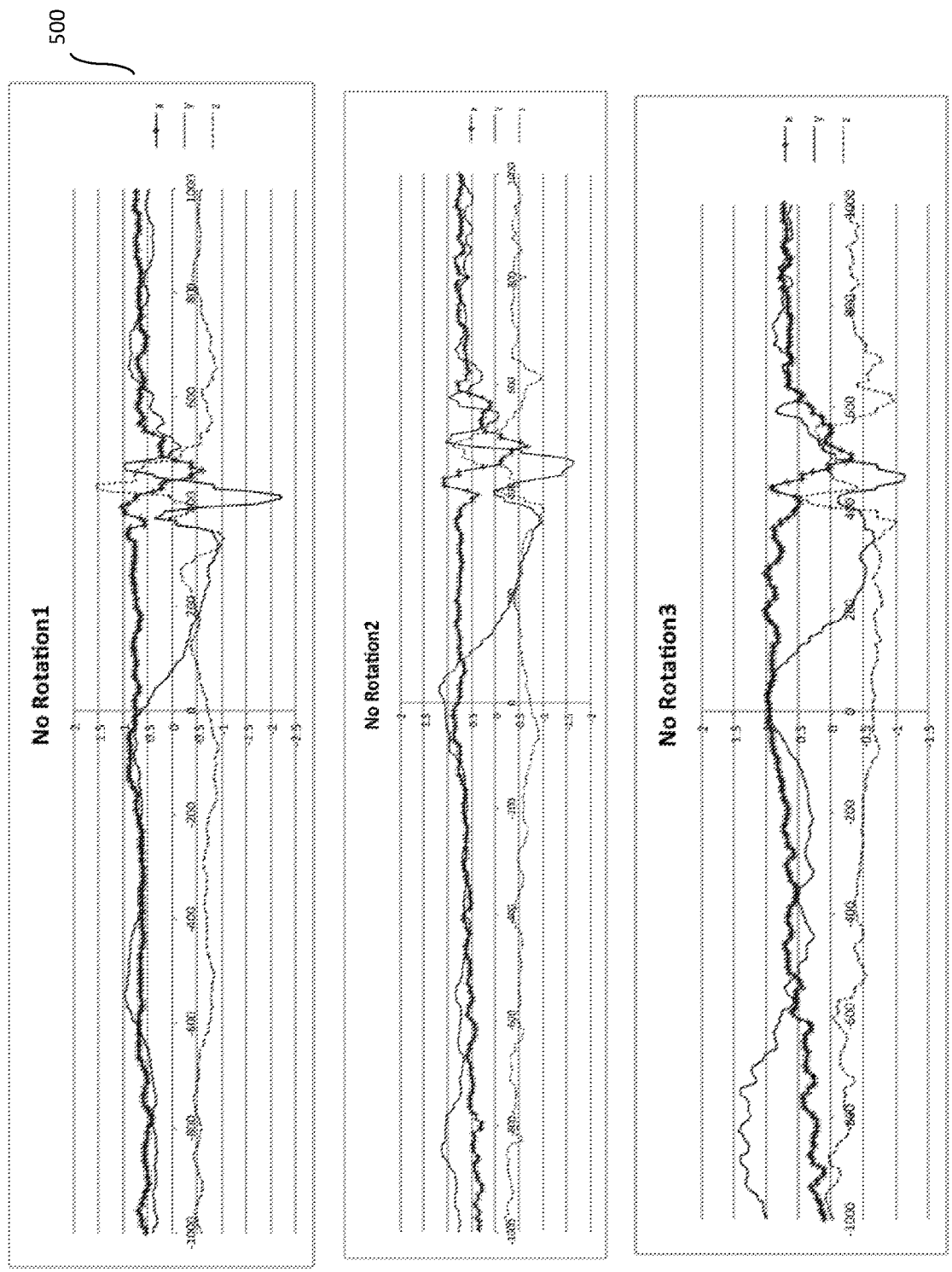
FIG. 5 is an accelerometer data plot from a basketball training system during a form shot, according to an embodiment.
Figure 6:
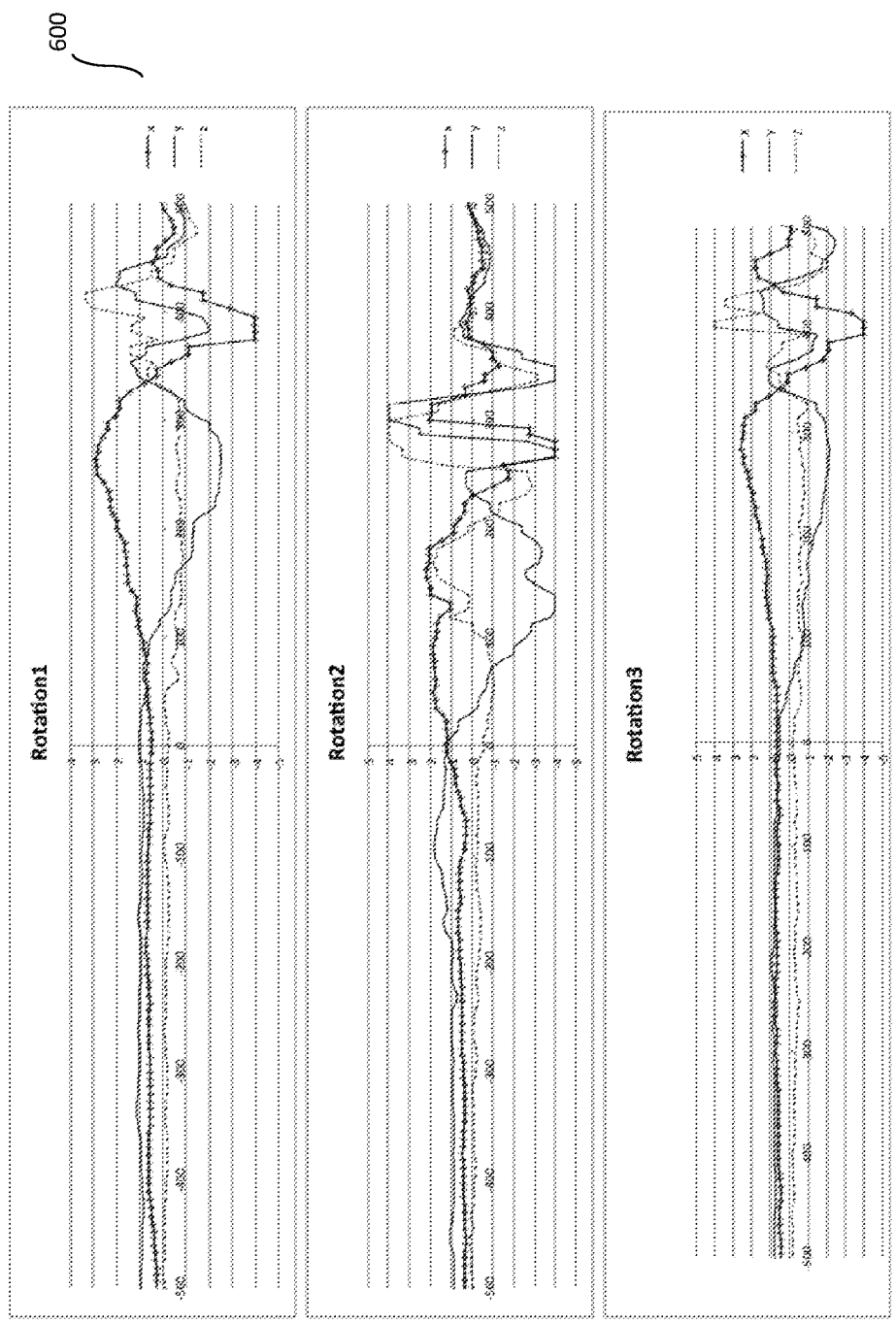
FIG. 6 is an accelerometer data plot from a basketball training system during a form shot, according to an embodiment; and, FIG. 7 is an accelerometer data plot from a basketball training system during a form shot, according to an embodiment.
Figure 7:
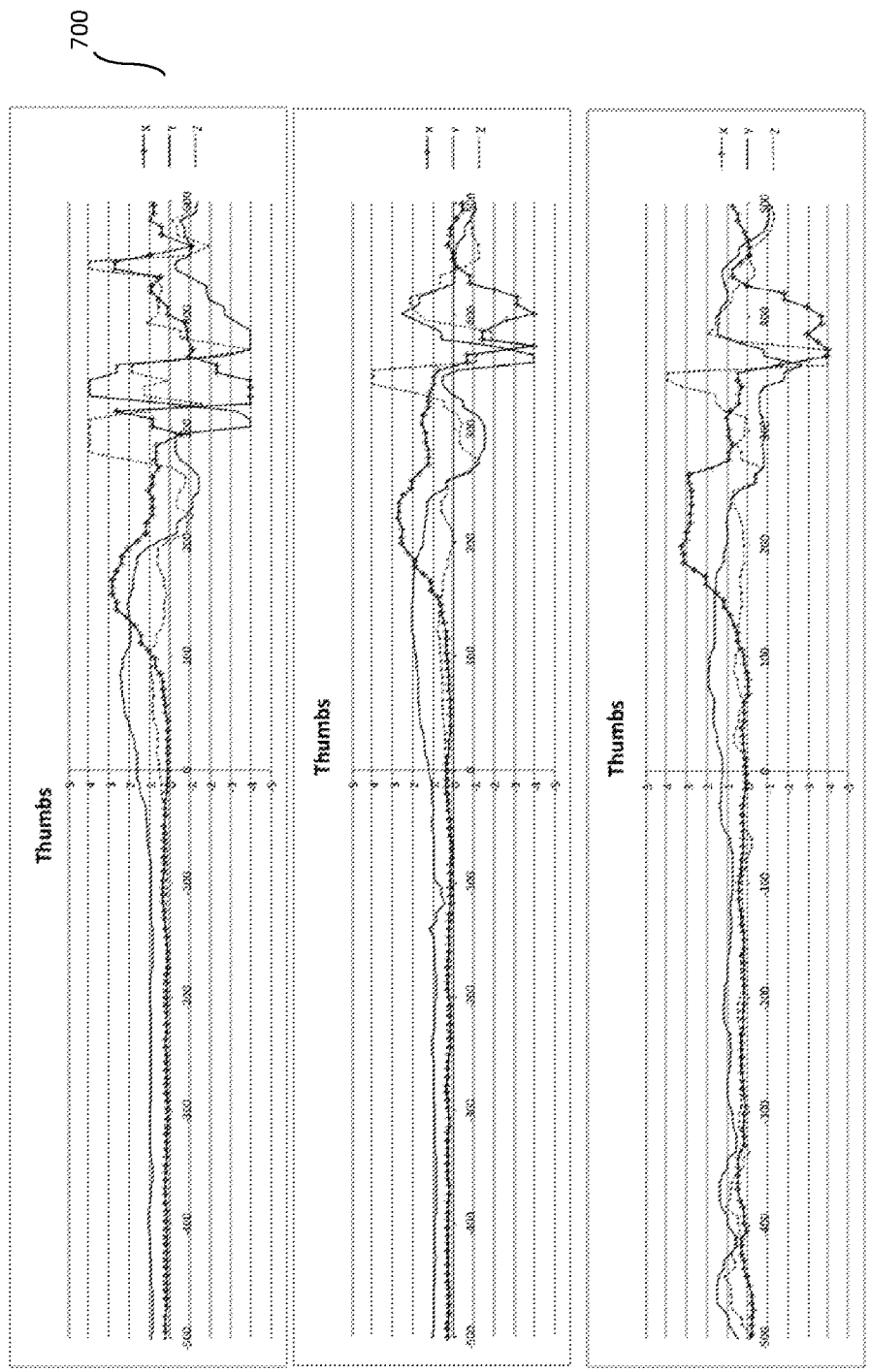

Referring now to FIGS. 5-7, accelerometer data plots from a basketball training system during a form shot are shown. FIGS. 5-7 illustrate g-force measurements captured through a device as shown and described in FIG. 1, in which the motion sensor is a three-axis accelerometer. In this example, the threshold value has been predetermined as 2 g; however, the threshold value may be increased or decreased depending on the level of sensitivity desired by the user and/or basketball coach, and the unit of measure may be different in embodiments where the sensor type is a sensor other than an accelerometer.

Accelerometer data 500 illustrates three attempts of a user shooting a basketball under conditions most closely resembling that of the proper form and technique as described above. In these attempts, g-force along the x-axis does not exceed 2 g. Under these conditions, an alert would not be delivered to a user.

Accelerometer data 600 illustrates three attempts of a user shooting a basketball with improper shooting technique, namely rotation of the wrist on the user's guide hand. In these attempts, g-force along the x-axis exceeds 2 g. Under these conditions, an alert would be delivered to the user in a format described above (e.g. auditory, haptic, and/or visual). The user and/or coach may take corrective action to the form and/or technique of the user's basketball shot in response to the alert.

Accelerometer data 700 illustrates three attempts of a user shooting a basketball with improper shooting technique, namely shooting with the user's thumbs on the guide hand and the shooting hand. In these attempts, g-force along the x-axis exceeds 2 g. Under these conditions, an alert would be delivered to a user in a format described above (e.g. auditory, haptic, and/or visual). The user and/or coach may take corrective action to the form and/or technique of the user's basketball shot in response to the alert.

Embodiments of the present disclosure provide a means for basketball players and basketball coaches to promote proper form and technique of a stationary, or form, basketball shot by measuring the movement or force of the player's balance hand through the basketball shot. If the movement or force of the player's balance hand through the basketball shot exceeds a threshold value, an alert is delivered to the user and/or the coach. This enables the user and/or the coach to take corrective action to facilitate proper form or technique in the user's basketball shot.

Embodiments of the present disclosure may be embodied as a self-contained device in which components such as those shown and described in FIG. 1 capture and analyze the movement of a user's guide hand during a basketball shot and deliver an alert to a user according to a movement threshold value; or, the present disclosure may be embodied as an application executing on a smart watch. Embodiments of the present disclosure may be a self-contained apparatus, or may be a system including a smartphone, computer and/or sensor-enabled basketball.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A basketball training system comprising:
    a housing having a rear side, a face side, and side walls, the housing having a wrist strap coupled to the side walls;
    a three-axis accelerometer coupled to an interior portion of the housing, the three-axis accelerometer being configured to capture acceleration data consisting of a g-force value along an x-, y-, and z-axis of a non-shooting hand of a user during a basketball shot;
    a microprocessor operably engaged with the three-axis accelerometer and coupled to the interior portion of the housing, the microprocessor configured to receive and process the acceleration data from the three-axis accelerometer, the microprocessor being further configured to execute at least one feedback protocol in response to the acceleration data;
    an output means operably engaged with the microprocessor and coupled to the interior portion of the housing, the output means configured to deliver feedback to the user in response to a feedback instruction from the microprocessor, wherein the feedback protocol comprises communicating the feedback instruction to the output means in response to a rotational or an acceleration g-force measurement by the three-axis accelerometer in excess of 2 g along the x-, y- or z-axis of the user's non-shooting hand;
    a power supply operably engaged with the microprocessor, the output means, and the three-axis accelerometer, and coupled to the interior portion of the housing; and,
    a smart phone communicably engaged with the microprocessor, the smart phone being configured to receive the acceleration data consisting of the g-force value along the x-, y-, and z-axis of the non-shooting hand of the user during the basketball shot, the smart phone being configured to analyze the user's shooting form using the acceleration data, and provide a user interface comprising a shooting form analysis to the user, the shooting form analysis consisting of g-force data corresponding to movement of the user's thumbs on the non-shooting hand and the shooting hand and g-force data corresponding to rotation of the user's wrist on the user's non-shooting hand.

2. The basketball training system of claim 1 further comprising a memory device operably engaged with the microprocessor and configured to store acceleration data from the accelerometer.

3. The basketball training system of claim 1 wherein the output means is a vibrating alert motor.

4. The basketball training system of claim 1 further comprising a display means operably connected with the microprocessor and coupled to the face side of the housing.

5. The basketball training system of claim 1 wherein the output means is in a format selected from the group consisting of visual, auditory, and haptic.

6. The basketball training system of claim 4 wherein the display means further comprises an input/output means.

7. A wrist-worn basketball training system comprising:
    a housing having a rear side, a face side, and side walls, the housing having a wrist strap coupled to the side walls;
    a three-axis accelerometer operably engaged with a microprocessor, the accelerometer and the microprocessor being coupled to an interior portion of the housing, the microprocessor configured to receive and process acceleration data consisting of a g-force value along an x-, y-, and z-axis of a non-shooting hand of a user during a basketball shot from the accelerometer and execute at least one feedback protocol in response to a rotational or an acceleration g-force measurement by the three-axis accelerometer in excess of 2 g along the x-, y-, or z-axis of the user's non-shooting hand;
    a vibrating alert motor operably engaged with the microprocessor, the vibrating alert motor configured to deliver a vibration in response to the rotational or the acceleration g-force measurement by the accelerometer in excess of 2 g along the x-axis of the user's non-shooting hand; and
    a smart phone communicably engaged with the microprocessor, the smart phone configured to receive the acceleration data consisting of the g-force value along the x-, y-, and z-axis of the non-shooting hand of the user during the basketball shot, the smart phone being configured to analyze the user's shooting form using the acceleration data, and provide a user interface comprising a shooting form analysis to the user, the shooting form analysis consisting of g-force data corresponding to movement of the user's thumbs on the non-shooting hand and the shooting hand and g-force data corresponding to rotation of the user's wrist on the user's non-shooting hand.

8. The wrist-worn basketball training system of claim 7 further comprising a memory device operably engaged with the microprocessor and configured to store acceleration data from the accelerometer.

9. The wrist-worn basketball training system of claim 7 further comprising a display means operably connected with the microprocessor and coupled to the face side of the housing.

10. The wrist-worn basketball training system of claim 7 wherein the microprocessor is that of a smart watch.

11. The wrist-worn basketball training system of claim 8 further comprising an output means for communicating the acceleration data from the accelerometer to the user.

\* \* \* \* \*